United States Patent [19]

Kusakabe et al.

[11] Patent Number: 5,607,098
[45] Date of Patent: Mar. 4, 1997

[54] TUBULAR SHAPE FINISHING APPARATUS FOR AN ELECTRO-RESISTANCE-WELDED PIPE

[75] Inventors: Ryoji Kusakabe; Tatsuaki Urata, both of Kobe, Japan

[73] Assignee: Kusakabe Electric & Machinery Co., Ltd., Hyogo-ken, Japan

[21] Appl. No.: 582,631

[22] Filed: Jan. 4, 1996

Related U.S. Application Data

[63] Continuation of Ser. No. 210,897, Mar. 17, 1994, abandoned.

[30] Foreign Application Priority Data

Oct. 20, 1993 [JP] Japan ................................ 5-262694

[51] Int. Cl.⁶ .......................... B23K 31/02; B23K 101/06
[52] U.S. Cl. .............................................. 228/17; 228/17.5
[58] Field of Search .................................. 228/17, 17.5

[56] References Cited

U.S. PATENT DOCUMENTS

| | | |
|---|---|---|
| 3,707,257 | 12/1972 | Wogerbauer et al. . |
| 4,339,938 | 7/1982 | Nakagawa et al. . |
| 4,614,293 | 9/1986 | Pazzaglia et al. ................. 228/17.5 X |
| 4,709,845 | 12/1987 | Akiyama et al. . |
| 4,865,243 | 9/1989 | Meier ................................ 228/17.5 X |

FOREIGN PATENT DOCUMENTS

| | | |
|---|---|---|
| 3-294008 | 12/1991 | Japan . |
| 5-212440 | 8/1993 | Japan . |

*Primary Examiner*—Kenneth J. Ramsey
*Attorney, Agent, or Firm*—Knobbe, Martens, Olson & Bear

[57] ABSTRACT

A tubular shape finishing apparatus in a steel pipe manufacturing system which molds band steel in a tubular shape while passing through a plurality of sets of forming roll stands and welds the butt portion by a seam welding unit, the tubular shape finishing apparatus welding the pipe by a seam welding unit, cutting off padding by a bead cutter, finishing and shaping the same into a shape of a desired diameter, and to be about an complete round, and comprising one or two of 3-roll forcible drive type stand or 3 or more roll forcible drive type stands disposed in series.

7 Claims, 6 Drawing Sheets

TUBULAR SHAPE FINISHING APPARATUS FOR AN ELECTRO-RESISTANCE-WELDED PIPE

This application is a continuation of U.S. patent application Ser. No. 08/210,897, filed Mar. 17, 1994, now abandoned.

FIELD OF THE INVENTION

The present invention relates to a tubular shape finishing apparatus for gradually molding band steel, that is, a strip of steel, in a tubular form by use of a plurality of forming roll stands, and then welding the seam portion by a seam welder to constitute an electro-resistance-welded pipe, and finishing the continuously manufactured electro-resistance-welded pipe to be about complete round.

BACKGROUND OF THE INVENTION

Conventionally, a 3-roll drive type pipe molding apparatus used as a reducer for urging to mold the electro-resistance-welded pipe smaller in diameter, is proposed and well-known by the same applicant, as disclosed in, for example, the Japanese Patent Laid-Open Gazette No. Hei 3-294008. Also, a 4-roll molding apparatus, in which an upper roll and a lower roll only are driven and a left roll and a right roll are idling, is of well-known technique and disclosed in, for example, the Japanese Patent Laid-Open Gazette No. Hei 5-212440.

SUMMARY OF THE INVENTION

The conventional 3-roll forcible drive type stand or a 4-roll forcible drive type stand has been used as a reducer for urging and reducing a diameter thereof.

In a usual steel-pipe. manufacturing apparatus, the electro-resistance-welded tube manufactured by passing through a forming-welding unit is finished to be of a desired pipe diameter and in complete round by a tubular shape finishing apparatus at the last stage, in which two upper and lower roll forcible drive type stand allows the pipe to gradually pass through 6 to 8 stands.

However, it is troublesome for step changing that such large number of 2-roll forcible drive type stands are disposed.

In the present invention, a roll stand for forcibly driving, at constant speed, 3 or more rolls such as 3-roll forcible drive type stand or a 4-roll forcible drive type stand is disposed only by one or two, thereby constituting the tubular shape finishing apparatus for the electro-resistance-welded pipe.

The above and further objects and novel features of the invention will more fully appear from the following detailed description when the same is read in connection with the accompanying drawings.

DESCRIPTION OF THE PREFERRED EMBODIMENT OF THE INVENTION

Next, an embodiment of the present invention will be described.

Figure 1:
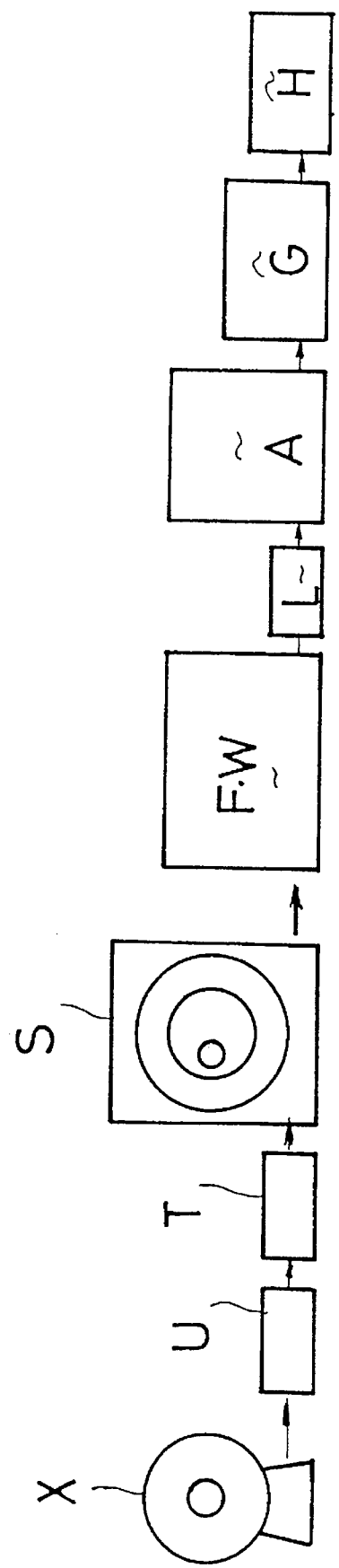
FIG. 1 is a view showing an entire layout of a steel pipe manufacturing apparatus.

In FIG. 1, a whole construction of a steel pipe manufacturing system will be described, in which a coil on which a strip is wound is rotatably supported to a mother coil X, and one end thereof is drawn out to be corrected of bending at the utmost end by a coil end correction device U.

The coil end correction device U corrects the utmost end of the strip of steel in order that, when the next coil end cut and weld device T welds the rear end of the strip of the former coil and the front end of the strip of the following coil so as to produce one continuous strip, the ends to be welded are prevented from causing misalignment therebetween.

In the manufacturing process of the steel pipe, since the large number of steel pipes are automatically and continuously manufactured, the steel tube manufacturing system cannot be stopped at a break of the coil.

In order to prevent a stop of the steel pipe manufacturing system at the break of the coil, the coil end cut and weld device T welds the rear end of the former coil with the front end of the following one. A strip accumulator S for storing a predetermined amount of coil is provided so that, the strip of the next coil is not pulled by that of the formed coil full of its allowable length during the welding work. The strip accumulator S is provided with a mechanism for storing therein an amount of strip for a time enough to weld the strips by the coil end cut and weld device T.

The strip having come out from the strip accumulator S passes a pass line 1 to be supplied to the forming welding unit FW, in which the strip is formed into a tubular shape while passing a plurality of stands, for example, six to eight forming roll stands 30, and welded by a seam welding unit 2. Furthermore, a bend cutter 31 cuts off padding at the welded portion and a pull-out stand 32 transports the strip to a cooling unit L.

The electro-resistance-welded pipe cooled by the cooling unit L is fed to a tubular shape finishing apparatus so as to be shaped of its diameter to a predetermined value, and also shaped into complete round. The electro-resistance-welded pipe finished by the tubular shape finishing apparatus A is cut in a predetermine length and put side by side on a run-out table H.

Next, explanation will be given on the apparatus in FIG. 2, in which the forming welding unit FW, cooling unit L and tubular shape finishing apparatus A in part.

Four sets of the forming welding unit FW are disposed around the four surfaces of a rotary bed 33 rotatably supported to the manufacturing system, the four sets disposing the forming roll stands 30 different in diameter as, for example, 40, 30, 20 and 14 mm.

The forming welding unit FW are changeable, at one stroke, by rotating the forming roll stands 30. A power transmitting unit can be detachably mounted also at one stroke. The strip at the pass line 1 is supplied from a coil guide 48 to the forming roll stand 30 and molded into tubular shape while passing through a plurality of forming roll stands and sent to the seam welding unit 2.

The seem welding unit 2 receives electric power from a high frequency welding current source 47. The electro-resistance-welded pipe after welded by the seam welding unit 2 passes through the bead cutter 31 to cut off needless padding, and then taken out from the pull-out stand 32 to the cooling unit L so as to be cooled thereby of its heat when welded and sent to the tubular finish apparatus A.

Figure 2:
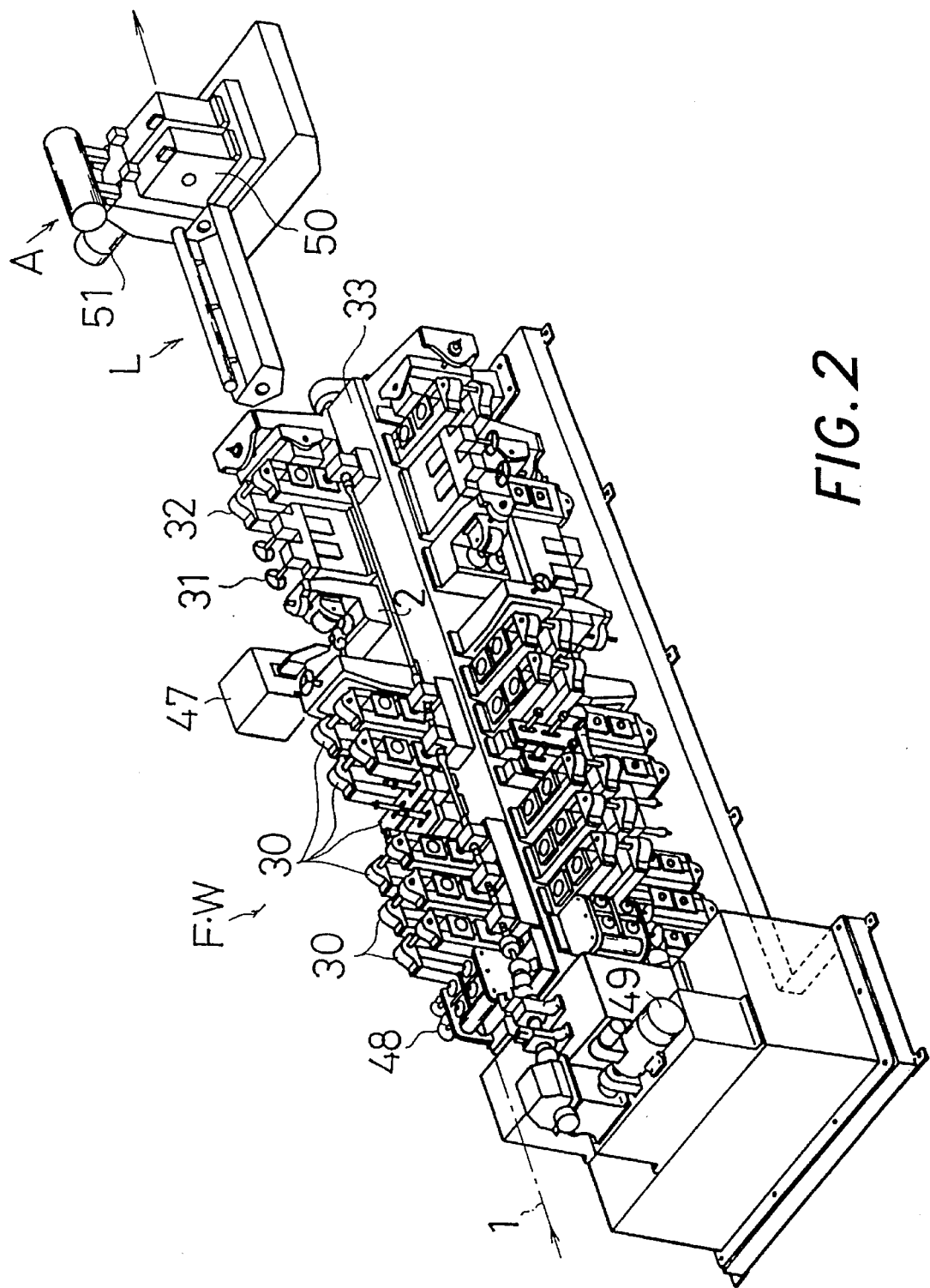
FIG. 2 is a perspective view of a forming-welding unit FW, a cooling unit L, and part of a tubular shape finishing apparatus A in the steel pipe manufacturing system.

FIG. 2 shows that two 3-roll forcible drive type stands driven by one driving motor 51 are disposed to form the tubular shape finishing apparatus A.

Figure 3:
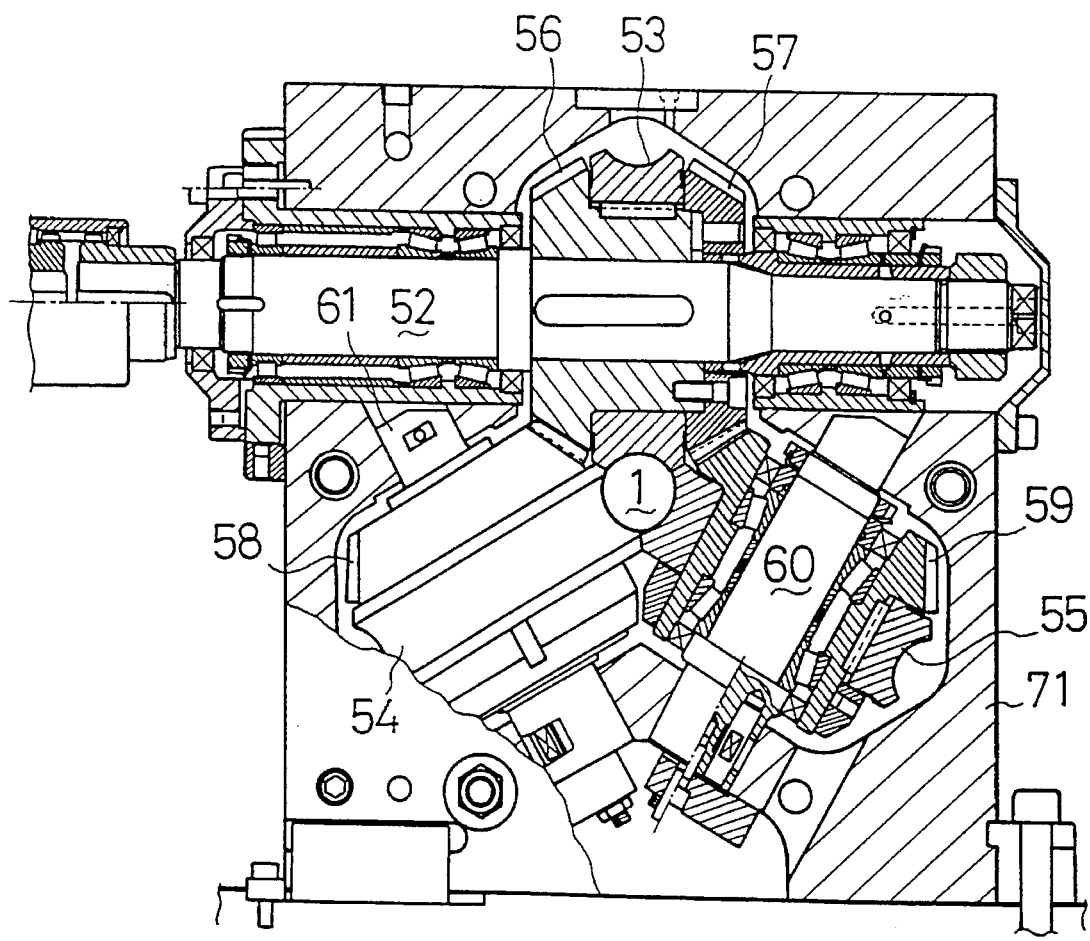
FIG. 3 is a sectional front view of a 3-roll forcible drive type stand.

Next, explanation will be given on the structure of 3-roll forcible drive type stand in FIG. 3, in which an input roll shaft 52 is driven by the driving motor 51. On the input roll shaft 52 are provided bevel gears 56 and 57 engaged with each other through a key. An upper roll 53 is fixed onto the outer periphery of the bevel gear 56, the bevel gear 56 engaging with a bevel gear 58 at a left roll 54 fitted onto a left roll shaft 61. The bevel gear 57 engages with a bevel gear 59 at a right roll 55 fitted onto a right roll shaft 60, the upper roll 53, left roll 54 and right roll 55 being forcibly rotated in the same number of rotations.

Bearing support mechanisms for the upper roll 53, left roll 54 and right roll 55 are constructed within the 3-roll stand frame 71. A gap of the pass line 1 constructed with the three rolls 53, 54 and 55 is adjustable from the exterior. When used as the tubular shape finishing apparatus A, two sets of pass lines 1 each comprising three rolls are slightly different from each other in the gap of the pass line, thereby finishing the pipe in a specified form at two steps.

In the embodiment in FIG. 2, the two 3-roll forcible drive type stands are disposed in series, but a shaping capacity thereof is high, whereby contraction shaping can be satisfactorily performed even with one 3-roll forcible drive type stand.

Figure 4:
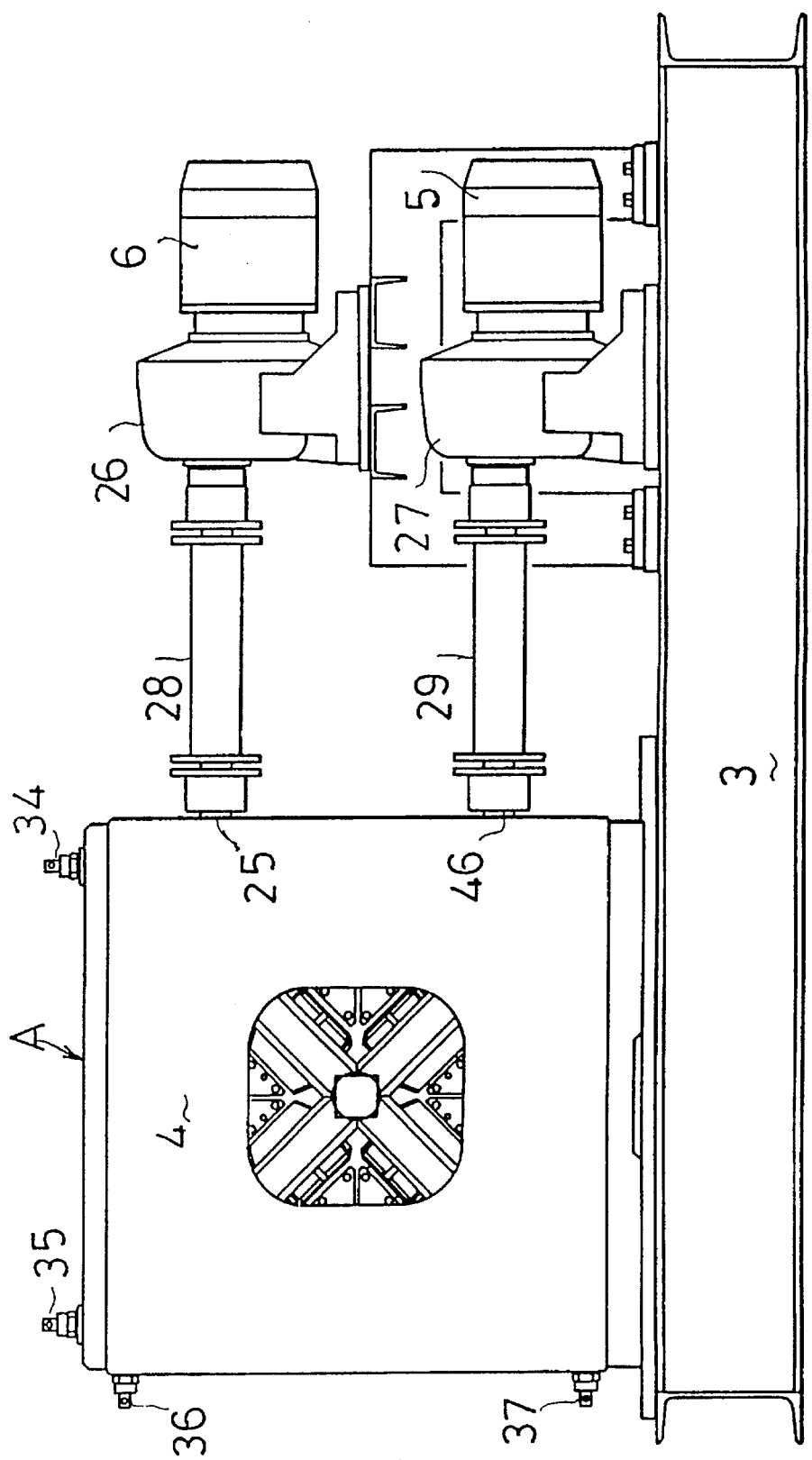
FIG. 4 is a front view of a 4-roll forcible drive type stand.
Figure 5:
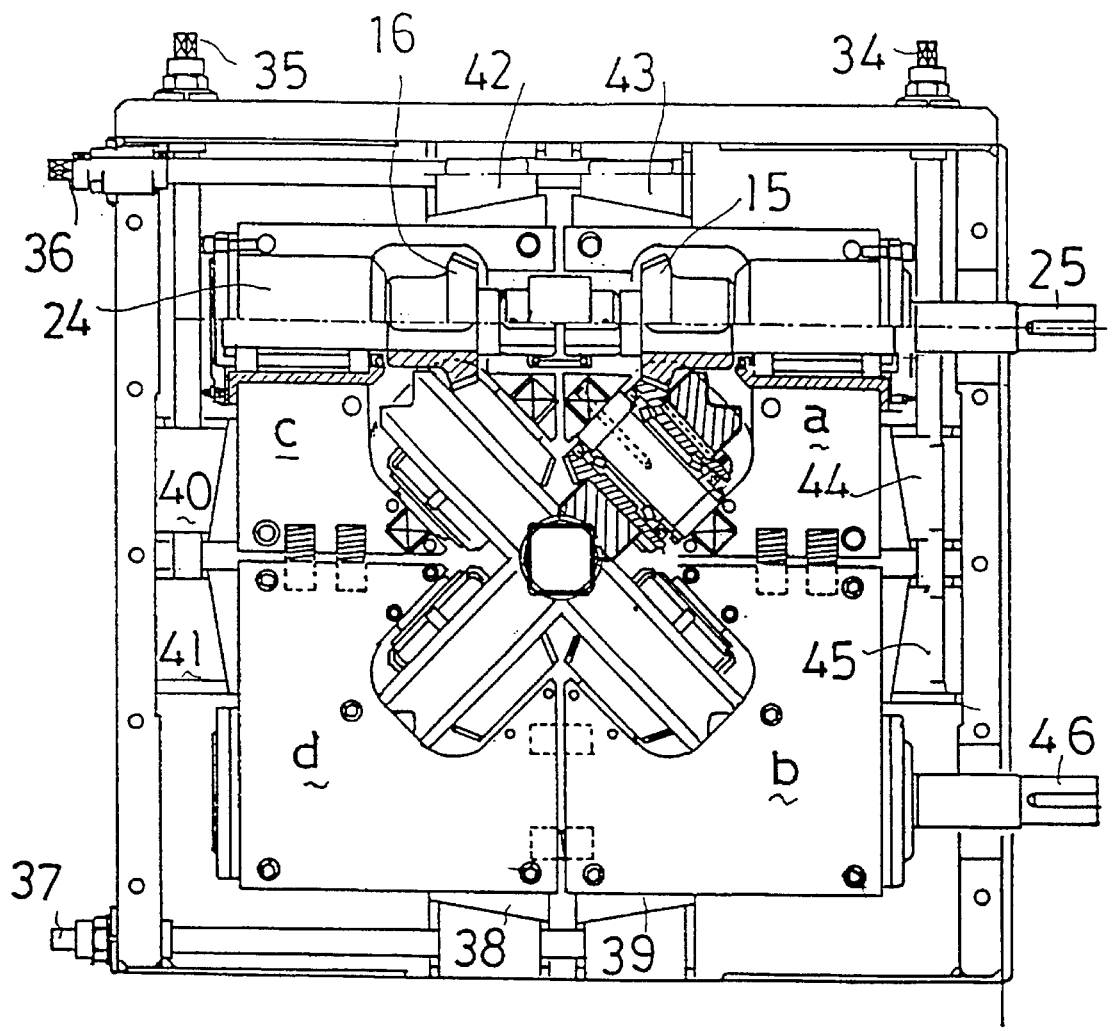
FIG. 5 is a sectional front view of the same.
Figure 6:
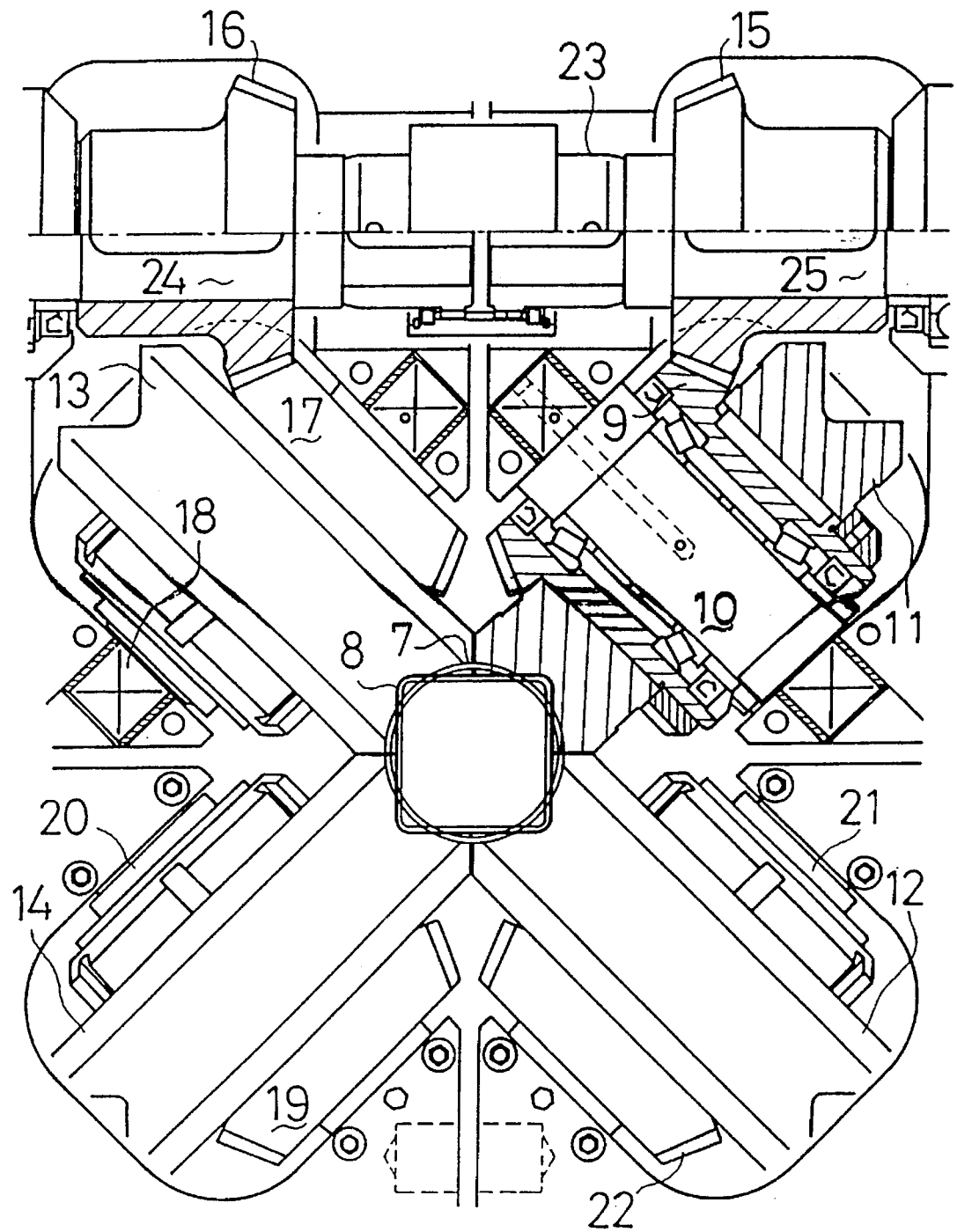
FIG. 6 is an enlarged sectional view of a roll portion of the same.

Next, explanation will be given on a 4-roll forcible drive hype stand shown in FIGS. 4, 5 and 6.

On a base 3 are disposed a tubular shape finishing apparatus A, an upper shaft driving motor 6 and a lower shaft driving motor 5, the upper shaft driving motor 6 being integral with a reduction gear mechanism 26, and the lower shaft. driving motor 5 being integral with a reduction gear mechanism 27. An upper transmitting shaft 28 projects from the reduction gear mechanism 26 and a lower transmitting shaft 29 from that 27 so as to drive an upper shaft 25 and lower shaft 46.

Four rolls are disposed in a roll stand frame 4 at the 4-roll forcible drive type stand so that the pipe, while passing the 4-roll forcible drive type stand is shaped in the predetermined pipe diameter or shaped to obtain the circularity of the tube. Two adjusting screw bolts 34 and 35 project from the upper surface of the stand 4, two adjusting screw bolts 36 and 37 projecting from the side surface of the same. The upper shaft 25 projects from the upper porting at the side surface, the lower shaft 46 projecting from the lower portion of the same. The upper shaft 25 is connected with other upper shaft 24 through a coupling 23, the lower shaft 46 connecting with other lower shaft through the same.

The two upper shaft are separate from the two lower shafts and slidable connected therebetween, because the aforesaid adjusting screw bolts 34, 35, 36 and 37 are required to enable adjusting blocks a, b, c and d divided into the rolls 11, 12, 13 and 14 to be movable laterally and vertically in order to adjust the space formed with four rolls 11, 12, 13 and 14.

The adjusting screw bolt 34 is provided with wedge mechanism 44 and 45 for leftwardly and rightwardly slidably adjusting the blocks a and b. The adjusting screw bolt 35 is provided with wedge mechanism 40 and 41 for leftwardly and rightwardly adjusting the blocks c and d. The adjusting screw bolt 36 is provided with wedge mechanisms 42 and 43 for vertically position-adjusting the adjusting blocks a and c. The adjusting screw bolt 37 is provided with wedge mechanisms 38 and 39 for vertically position-adjusting the adjusting blocks b and d. The adjusting screw bolts 34 and 35 and those 36 and 37, which are related to each other through the wedge mechanisms, should simultaneously be adjusted, the adjusting screw bolts 34 and 35 and 36 and 37 being adjusted to enable the diameter of the electro-resistance-welded pipe to be changed in diameter to a certain extent.

A bevel gear 15 is fixed onto the upper shaft 25, and engages with a bevel gear 9 on a roll shaft 10, and a roll 11 is fixed onto the outer periphery of the bevel gear 9. A bevel gear 16 is fixed onto the outer periphery of an upper shaft 24 and engages with a bevel gear 17 on a roll shaft 18, a roll 13 is fixed to the outer periphery of the bevel gear 17. Similarly, a bevel gear on the lower shaft 46 engages with a bevel gear 22 on a shaft 21, and a roll 12 is fixed to the outer periphery of the bevel gear 22. A roll 14 is fixed onto the outer periphery of a bevel gear 19 on a roll shaft 20, the four rolls 11, 12, 13 and 14 being forcibly rotatable in the same number of rotations.

The upper shaft 25 and lower shaft 46 are disposed vertically in parallel and the rolls 11, 12, 13 and 14 are freely fitted onto the roll shaft 10, 21, 20 and 18 in relation of being forcibly driven at an angle of 45° with respect to the respective upper shaft 25 and lower shaft 46. In a space formed of the four rolls 11, 12, 13 and 14 is constructed a molding space of the pass line 1 through which the electro-resistance-welded pipe can pass. The rolls 11, 12, 13 and 14 each are changed in shape so as to enable a cylindrical pipe 7 to be shaped and an angular pipe 8 to be done.

The present invention, which is constructed as the above-mentioned, has the following advantages: Conventionally, when the electro-resistance-welded pipe is finished in a tubular shape after molded and welded, the stands at the two upper and lower rolls and two left and right rolls are disposed in six to eight sets in series so as to gradually mold the pipe. In this case, however, the line of steel pipe manufacturing system is longer, and when the pipe diameter is changed, a diameter of the stand at the tubular shape finishing apparatus must be changed. Therefore, it takes much time to exchange the rolls. On the contrary, the 3-roll forcible drive type stand or the 4-roll forcible drive type stand, as in the present invention, is used as the tubular shape finishing apparatus A, whereby one to two sets of stands are enough and the line of the steel pipe manufacturing system can be reduced in length.

Also, since the 3-roll forcible drive type stand or the 4-roll forcible drive type stand is used in the tubular shape finishing apparatus A, the electro-resistance-welded pipe is improved in the bite efficiency thereof and can increase the speed of the shaping line. The tubular shape finishing apparatus A increases in the speed thereof, whereby the steel pipe manufacturing system can be improved in the entire efficiency.

Also, the invention has been described with reference to several different embodiment, these embodiments are merely exemplary and not limiting of the invention which is defined by the appended claims.

What is claimed is:

1. A tubular shape finishing apparatus in a steel pipe manufacturing system for forming an electro-resistance-welded steel pipe from band steel, comprising:

a plurality of forming roll stands which receive and transfer said band steel, said forming roll stands forcing said band steel to form a steel pipe while transferring said band steel thereon;

a seam welding unit for welding edges of said band steel formed into said steel pipe by said forming roll stands so as to form a seam on said steel pipe;

a cutter for removing padding from a portion of said steel pipe welded by said seam welding unit; and a finishing unit for finishing said steel pipe into a desired size, said finishing unit comprising a forcible drive type stand having four rollers driven by an external force generated by a drive motor such that said rollers forcibly transfer and finish said steel pipe at the same time, said forcible drive type stand including a pair of input shafts which are connected to said drive motor, each of said input shafts being provided with bevel gears which couple with two of said four rollers.

2. A tubular shape finishing apparatus as defined in claim 1, wherein said finishing unit further includes an adjusting mechanism for adjusting an inner diameter formed by said four rollers.

3. A tubular shape finishing apparatus as defined in claim 2, wherein said adjusting mechanism is formed of a set of adjusting screw bolts each of which is rotationally controlled and a set of adjusting blocks each of which corresponds to said adjusting screw bolt.

4. A tubular shape finishing apparatus as defined in claim 3, wherein said set of adjusting screw bolts is formed of four adjusting screws.

5. A tubular shape finishing apparatus as defined in claim 3, wherein said set of adjusting blocks is formed of four adjusting blocks.

6. A tubular shape finishing apparatus as defined in claim 3, wherein each of said adjusting screw bolts and each of said adjusting blocks is coupled with each other through a wedge mechanism.

7. A tubular shape finishing apparatus as defined in claim 1, wherein said pair of input shaft is an upper shaft and a lower shaft, and said drive motor is formed of an upper shaft driving motor connected to said upper shaft and a lower shaft driving motor connected to said lower shaft.

* * * * *